United States Patent
Dougan et al.

(10) Patent No.: US 6,695,589 B1
(45) Date of Patent: Feb. 24, 2004

(54) CONTROL FOR AN ELECTRIC MOTOR DRIVEN PUMP

(75) Inventors: Kevin Michael Dougan, Plymouth, MI (US); Charles Wayne Lewis, Brighton, MI (US); Richard Francis Olenzek, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/277,103

(22) Filed: Mar. 26, 1999

(51) Int. Cl.[7] ............................................. F04B 49/00
(52) U.S. Cl. ............................... 417/26; 482/5; 141/59
(58) Field of Search ............................. 417/26, 22, 23, 417/44.2, 213; 60/39.38; 482/5; 221/1; 123/497; 141/59

(56) References Cited

U.S. PATENT DOCUMENTS

| | | | |
|---|---|---|---|
| 3,672,164 A | * 6/1972 | Pieper | 60/39.38 |
| 4,063,726 A | * 12/1977 | Wilson | 482/5 |
| 4,801,247 A | * 1/1989 | Hashimoto et al. | 417/213 |
| 5,284,119 A | * 2/1994 | Smitley | 123/497 |
| 5,332,125 A | * 7/1994 | Schmitkons et al. | 222/1 |
| 5,673,732 A | * 10/1997 | Kenney et al. | 141/59 |

* cited by examiner

Primary Examiner—Quang T. Van
(74) Attorney, Agent, or Firm—Leslie C. Hodges

(57) ABSTRACT

An electric motor driven pump has a regulator valve for establishing a system pressure within a predetermined pressure range. The regulator valve has three bias pressures and a spring force imposed thereon. One of the bias pressures assists the spring to increase the system pressure and the other two bias pressures either balance the spring and one bias pressure or lower the system pressure. The one bias pressure is established by an electro-hydraulic control mechanism as a function of operating parameters in a powertrain which uses the fluid pressure from the pump. One of the other bias pressures is equal to system pressure and the last bias pressure is available when a predetermined drive condition is requested in the powertrain. A first electrical switch is activated by fluid pressure from the regulator valve if the system pressure is below the demanded pressure and a second electrical switch is activated by fluid pressure from the regulator valve if the system pressure is above the demanded pressure. The signals regarding the condition of the electrical switches is conveyed to the electro-hydraulic control so that the speed of the electric motor can be properly adjusted.

15 Claims, 1 Drawing Sheet

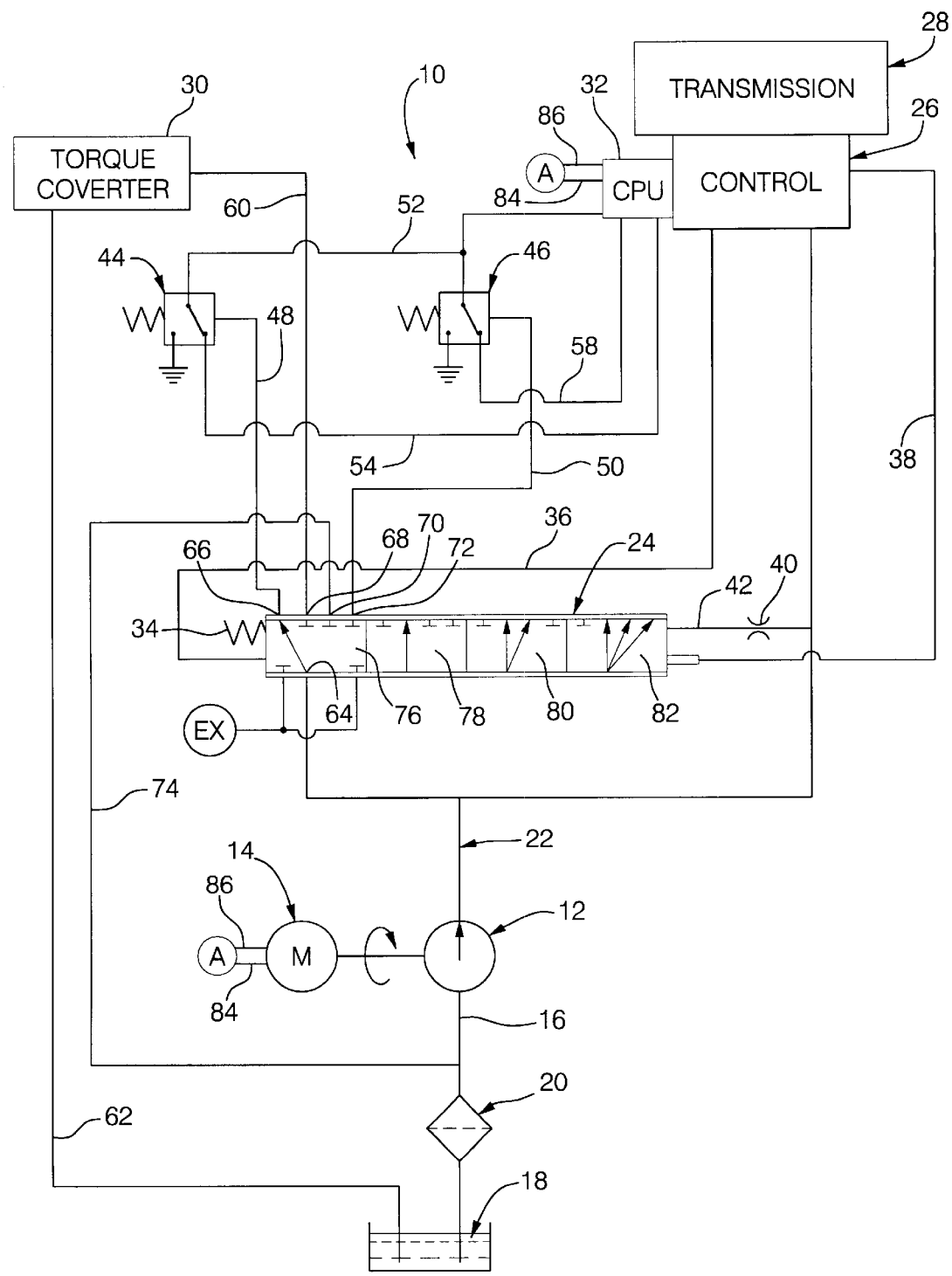

CONTROL FOR AN ELECTRIC MOTOR DRIVEN PUMP

TECHNICAL FIELD

This invention relates to hydraulic systems having a positive displacement pump for supplying pressurized fluid to hydraulically-operated devices, and more particularly to electro-hydraulic mechanisms for controlling the output flow of the pump.

BACKGROUND OF THE INVENTION

Positive displacement pumps are used to supply pressurized fluid in automatic transmissions for providing power to actuate various torque transmitting elements such as clutches, brakes and torque converters. The pump is generally driven directly by the engine at the transmission input or through a gear train at the transmission input. The pump is a positive displacement type pump of the gear type or vane type. The vane type pumps can be a variable displacement device.

The output pressure of the pump is established by a pressure regulator valve that is controlled by a control system which may be either hydraulic or electro-hydraulic in nature. Most modern automatic transmissions have electro-hydraulic controls which provide a more versatile control system in both pressure control and power transmission control.

Since the pumps are driven at engine speed, the maximum output volume at any particular instant is determined by the engine speed at that time. Also, the pump is driven at high speeds when the vehicle is travelling at highway speeds. With a fixed displacement pump, the volume output is very high at the high engine speeds which can result in cavitation at the pump inlet which results in an undesirable noise situation. This condition also results in a decrease in system efficiency since much of the pump volume is not needed and is therefor returned to the transmission sump of the system cooler.

While variable displacement type pumps alleviate some of the problems, they do not address all of them. During engine idle or slow speed at high operating temperatures, the pump output can be significantly diminished due to leakage in the pump structure. Under these circumstances, the output pressure can be lower than desirable. This can introduce slower than desired ratio interchanges and low apply pressures at the friction devices in the transmission. Also the manufacturing cost of the variable displacement pump and related controls is often higher than the cost of a fixed displacement pump.

SUMMARY OF THE INVENTION

It is an object of the present invention to provide an improved control for a transmission supply pump.

In one aspect of the present invention, a positive displacement pump is driven by an electric motor which is speed controlled to provide an output pressure between defined limits. In another aspect of the present invention, the output pressure is controlled by a regulator valve which receives signals from a transmission electro-hydraulic control.

In yet another aspect of the present invention, the low pressure limit of the regulator valve is sensed by a pressure activated switch that provides a signal to the transmission control requesting a pump speed increase to increase the pump output volume. In still another aspect of the present invention, the high pressure limit is sensed by a switch that signals the transmission control to reduce the speed of the pump to reduce the pump output flow.

The control system includes an electric motor driven pump for supplying hydraulic fluid to an electro-hydraulic mechanism for controlling various transmission functions such as ratio interchanges, the apply pressure for various friction devices, fluid feed to the torque converter and clutch and various control pressure signals. The pump output pressure is established by a multi-stage regulator valve that supplies main system pressure fluid to the electro-hydraulic control portion of the transmission. The electro-hydraulic control establishes many control pressure levels through the use of variable pressure devices such as pwm solenoids and variable bleed solenoids. These pressure levels are used to provide ratio interchange signals, speed signals and throttle or torque demand signals to name a few.

When the main system pressure level is satisfied, the regulator valve distributes pressurized fluid to the torque converter and clutch. After this subsystem is satisfied, the regulator valve distributes fluid to a lubrication and cooling circuit and also returns excess fluid to the transmission reservoir. Two pressure activated devices are included in the present invention to accommodate a low pressure limit and a high pressure limit. If either of these pressure activated devices changes state, the central processing unit (CPU) in the electro-hydraulic control is effective to change motor speed at the pump in accordance with a stored array of data such that the pump output will be adjusted accordingly.

BRIEF DESCRIPTION OF THE DRAWING

The drawing is a schematic diagram of a transmission control system incorporating the present invention.

DESCRIPTION OF AN EXEMPLARY EMBODIMENT

A transmission control system 10 is shown schematically in the drawing. The control 10 has a pump 12 driven by a variable speed electric motor 14. The pump 12 is connected to an inlet passage or conduit 16 through which the pump 12 draws hydraulic fluid from a reservoir 18 through a filter 20. The pump 12 delivers pressurized fluid through a main passage 22 to a regulator valve 24 and an electro-hydraulic control 26. The regulator valve 24 can be disposed in the control 26 or separately in a housing, not shown, of a transmission 28 in a conventional powertrain.

The transmission 28 is a conventional power transfer device and may be of the step ratio type or the continuously variable type. If a step ratio transmission is employed, it will include such components as planetary gear sets, friction clutches, and friction brakes. The gear sets need cooling and lubrication fluid and the clutches and brakes need both cooling fluid and pressurized fluid for engagement control.

If a variable type transmission is used, it will include a planetary gear set for forward and reverse operation and friction devices to establish the forward and reverse operation. The variable type transmission will also include a continuously variable unit such as a pulley and belt arrangement. These arrangements generally have moveable sheaves which are positioned by hydraulic fluid pressure.

Both types of transmissions will generally include a selectively operable input device such as a torque converter 30 or an automatic starting clutch, not shown. Both of these types of input devices are conventional elements familiar to those skilled in the art of power transmission. These devices also need pressurized fluid for their operation and fluid for cooling.

The control 26 houses a plurality of conventional valve elements and electronic actuation devices such as solenoids and force motors. The control 26 also include a central processing unit (CPU) 32 which is generally comprised of a preprogrammed digital computer. The CPU 32 has a number of data array or tables incorporated therein which provide the necessary information for control pressure values and ratio interchange timing to name a few. One or more of the array will store the data for determining the desired pressure in the main passage 22 during transmission operation. The pressure in the passage 22 is not a constant but has different levels depending on the operating condition requested.

To establish the pressure level in the main passage 22, the regulator valve 24 has a spring 34, a control passage 36, a signal passage 38 and a connection with the main passage 22 through a restriction 40 and a passage 42. The pressure in control passage 36 is determined by one or more of the array in the CPU 32 to provide a pressure bias on the regulator valve to assist the spring 34 in urging the regulator valve 24 to a higher pressure position. The pressure in the passage 42 is equal to the pressure in main passage 22 and urges the regulator valve 24 to a lower pressure position. The pressure in the signal passage 38 is generated in the control 26 and may be present when a forward drive is selected by the operator. The pressure in passage 38 assist in urging the regulator valve 24 toward a lower pressure position.

A pair of pressure activated devices in the form of switches 44 and 46 are in fluid communication with the regulator valve 24 through respective passages 48 and 50. Both switches 44 and 46 have a spring set position, shown, and a pressure set position. The switch 44 is electrically connected with a voltage source through a wire 52 and with the CPU 32 through a control wire 54. When the switch 44 is in the spring set position shown, the CPU 32 receives an electrical signal therefrom and when the switch 44 is in the pressure set position, due to pressure in passage 48, the signal is discontinued.

The switch 46 is electrically connected with the voltage source through the wire 52 also and to the CPU 32 through a signal wire 58. When the switch 46 is in the spring set position shown, the CPU 32 receives an electrical signal therefrom and when the switch 46 is in the pressure set position, due to pressure in passage 50 the electrical signal is discontinued. Thus the switches 44 and 46 are normally closed type switches. Those skilled in the art will recognize that normally open type switches can also be used for one or both of the switches 44 and 46.

The torque converter 30 is also in fluid communication with the regulator valve 24 through a passage 60 and with the reservoir 18 through a passage 62. The torque converter 30 is a conventional hydro-dynamic fluid drive device. These devices are well known in the art of power transmission. The torque converter 30 receives pressurized fluid from the regulator valve 24 and returns fluid to the reservoir 18. The torque converter can include a torque converter clutch which as is well known will improve the efficiency of the transmission when it is engaged.

The regulator valve 24 has an inlet port 64 connected with the main passage 22 and four outlet ports 66, 68, 70, and 72 connected with passage 48, passage 60, a return passage 74 and passage 50 respectively. The regulator valve 24 has four stages of operation 76, 78, 80 and 82. The passage 74 can be connected into the transmission lubrication and cooling circuits if desired.

In the rightmost position shown, the valve 24 is operating in stage 76. As the valve 24 moves leftward due to the fluid pressure in passages 42 and 38 counteracting the spring 34 and the pressure in passage 36, the valve 24 will move progressively to stages 78, 80 and 82.

When the regulator valve 24 is in stage 76, only the passage 48 is pressurized downstream of the pressure regulator valve 24. This will result in the switch 44 being placed in the pressure set position. The absence of electrical power in the wire 54 will inform the CPU 32 of this event. When the regulator valve 24 is in stage 78, only the passage 60 will be pressurized downstream of the pressure regulator valve 24 and the passage 48 will be exhausted at the regulator valve 24. This will allow the switch 44 to return to the spring set position and the torque converter will receive charge pressure through the passage 60. When the regulator valve 24 is in the stage 80, the passages 60 and 74 receive fluid downstream of the pressure regulator valve 24 and the passages 48 and 50 are exhausted at the regulator valve 24. This is the normal operating stage for the regulator valve 24. When the regulator valve 24 is in stage 82, the passages 60, 74 and 50 will all receive fluid downstream of the pressure regulator valve 24. The fluid in passage 50 will actuate the switch 46 to the pressure set position thereby disconnecting the electrical source from the wire 58. Thus, the CPU will be informed that this stage 82 has been reached.

The electric motor 14 receives power from the electrical source through wires 84 and 86. The electrical power flowing in the wires 84 and 86 will determine the speed of the motor 14 and therefore the speed of the pump 12. Since the fluid output of the pump 12 is proportional to the speed thereof, as the speed increases, the fluid flow increases and vice-versa. The speed at which the motor 14 operates is controlled by the CPU 32. The CPU 32 takes many factors including the operating condition requested, vehicle speed, throttle setting and temperature into account when setting the speed of the motor 14. These factors are contained in array in the CPU 32.

Due to many external conditions and internal wear of components, these arrays can need updating from time to time and from transmission to transmission. The switches 44 and 46 provide signals which indicate that updating or adaptive correction is required. If the system pressure in the main passage 22 becomes lower than required, the switch 44 will be activated to signal the CPU 32 that correction is needed. The CPU 32 will accordingly increase the speed of the motor 14 to provide more fluid flow from the pump 12 and update the array in the CPU 32 as required. If the system pressure in the main passage 22 is sufficiently elevated to place the regulator valve 24 at stage 82, the switch 46 will be actuated, thereby signaling the CPU 32 of this event. The CPU 32 will signal the motor 14 to decrease speed and thereby reduce the fluid flow from the pump 12 until the overpressure situation is rectified. The CPU 32 will update the array as required to prevent a recurrence of the situation.

To prevent pump speed changes that are commanded during brief transient conditions, the CPU 32 preferably incorporates a timer which delays the adaptive change to the array suggested by the pump speed adjustment commanded by the actuation of either switch 44 or 46. This prevents cycling or "hunting" of the pump system seeking to satisfy the pressure command of the switch signals.

In some hydraulic systems it may be possible to eliminate the high pressure switch 46. This will depend on the system design and the flow area of the passage 74. If flow restrictions such as a cooler are present in the passage 74, the switch 46 will serve to protect the cooler from excess pressure.

The CPU 32 will preferably contain a number of array that are used to determine the speed of the motor 14. For example, a low flow array or table is used during most high engine speed conditions when minimum hydraulic flow is needed and no shift interchanges are perceived. A high flow array or table is used when a shift interchange or sheave movement is contemplated or undertaken. Many of these conditions can be anticipated by the control system based on the operating parameters of the vehicle and the powertrain such as the throttle opening, vehicle speed, or the gear ratio presently being utilized to name a few. This permits the speed of the motor 14 and therefore the output of the pump 12 to be adjusted in anticipation of the change in pressure and flow requirements.

The use of an electric motor driven and the switches 44 and 46 provide many advantages for the powertrain hydraulic system. The pump can be located near or in the reservoir 18 to eliminate the amount of intransit oil between the reservoir and the pump inlet. The mechanical structure presently used to drive the prior art pumps is eliminated. The size of the pump can be independent of engine size and engine idle speed. The pump flow is reduced at high vehicle operating speed. The pump is independent of engine operation and can be activated during vehicle towing for system lubrication either from the vehicle electrical system or from an external electrical source.

What is claimed is:

1. An electro-hydraulic system of an automotive transmission comprising:
   a variable speed motor;
   a controller operable to control the speed of said motor;
   a pump driven by said motor and having an output pressure to a main passage;
   a regulator valve in downstream flow relation with said pump for controlling said output pressure of said pump in said main passage, said regulator valve having a spring and a control passage on one side and a signal passage and said main passage on an opposing side wherein pressure in said control passage is determined by said controller to urge said regulator valve to a higher pressure position, and pressure in said signal passage is determined by said controller to urge said valve to a lower pressure position; and
   a first pressure activated switch in downstream flow relation with said regulator valve and being operable to provide an electric signal to said controller to increase the speed of said variable speed motor when said output pressure is below a lower pressure limit.

2. An electro-hydraulic system of an automotive transmission, as defined in claim 1, further comprising:
   a second pressure activated switch in downstream flow relation with said regulator valve and being operable to provide an electric signal to said controller to decrease the speed of said motor when said output pressure is above an upper pressure limit.

3. An electro-hydraulic system of an automotive transmission, said electro-hydraulic system comprising:
   a motor;
   a controller controlling said motor;
   a first passage;
   a pump in fluid communication with said first passage and driven by said motor, said pump outputting a fluid pressure to said first passage; and
   a regulator valve positioned downstream relative to said pump, said regulator valve being operable to vary said fluid pressure in said first passage, said regulator valve being biased on a first side by a second passage and on an opposing second side by a third passage and said first passage, said controller controlling pressure within said second passage to urge said regulator valve to a higher pressure position, said controller further controlling pressure within said third passage to urge said regulator valve to a lower pressure position.

4. The electro-hydraulic system according to claim 3, further comprising:
   a first pressure activated switch positioned downstream relative to said regulator valve, said first pressure activated switch being operable to provide a signal to said controller when said fluid pressure is below a predetermined limit.

5. The electro-hydraulic system according to claim 4, further comprising:
   the first pressure activated switch positioned downstream relative to said regulator valve, said first pressure activated switch being operable to provide a signal to said controller when said fluid pressure is below a predetermined limit.
   a second pressure activated switch positioned downstream relative to said regulator valve, said second pressure activated switch being operable to provide a signal to said controller when said fluid pressure is above a predetermined limit.

6. The electro-hydraulic system according to claim 3 wherein said motor is a variable speed motor.

7. The electro-hydraulic system according to claim 3 wherein said first passage is a main passage, said second passage is a control passage, and said third passage is a signal passage.

8. The electro-hydraulic system according to claim 3, further comprising:
   a spring biasing said regulator valve on said first side.

9. The electro-hydraulic.system according to claim 3 wherein said pump is a positive displacement hydraulic pump.

10. An electro-hydraulic system of an automotive transmission, said electro-hydraulic system comprising:
    a motor;
    a controller controlling said motor;
    a first passage;
    a pump in fluid communication with said first passage and driven by said motor, said pump outputting a fluid pressure to said first passage;
    a regulator valve positioned downstream relative to said pump, said regulator valve being operable to vary said fluid pressure in said first passage, said regulator valve being biased on a first side by a second passage and on an opposing second side by a third passage and said first passage, said controller controlling pressure within said second passage to urge said regulator valve to a higher pressure position, said controller further controlling pressure within said third passage to urge said regulator valve to a lower pressure position; and
    a first pressure activated switch positioned downstream relative to said regulator valve, said first pressure activated switch being operable to provide a signal to said controller when said fluid pressure is below a predetermined limit.

11. The electro-hydraulic system according to claim 10, further comprising:
    a second pressure activated switch positioned downstream relative to said regulator valve, said second pressure activated switch being operable to provide a signal to said controller when said fluid pressure is above a predetermined limit.

12. The electro-hydraulic system according to claim 10 wherein said motor is a variable speed motor.

13. The electro-hydraulic system according to claim 10 wherein said first passage is a main passage, said second passage is a control passage, and said third passage is a signal passage.

14. The electro-hydraulic system according to claim 10, further comprising:

a spring biasing said regulator valve on said first side.

15. The electro-hydraulic system according to claim 10 wherein said pump is a positive displacement hydraulic pump.

\* \* \* \* \*